Nov. 8, 1960 K. VAN DE KERKE 2,959,488
METHOD OF STERILIZING FOODSTUFF
Filed June 27, 1957 2 Sheets-Sheet 2

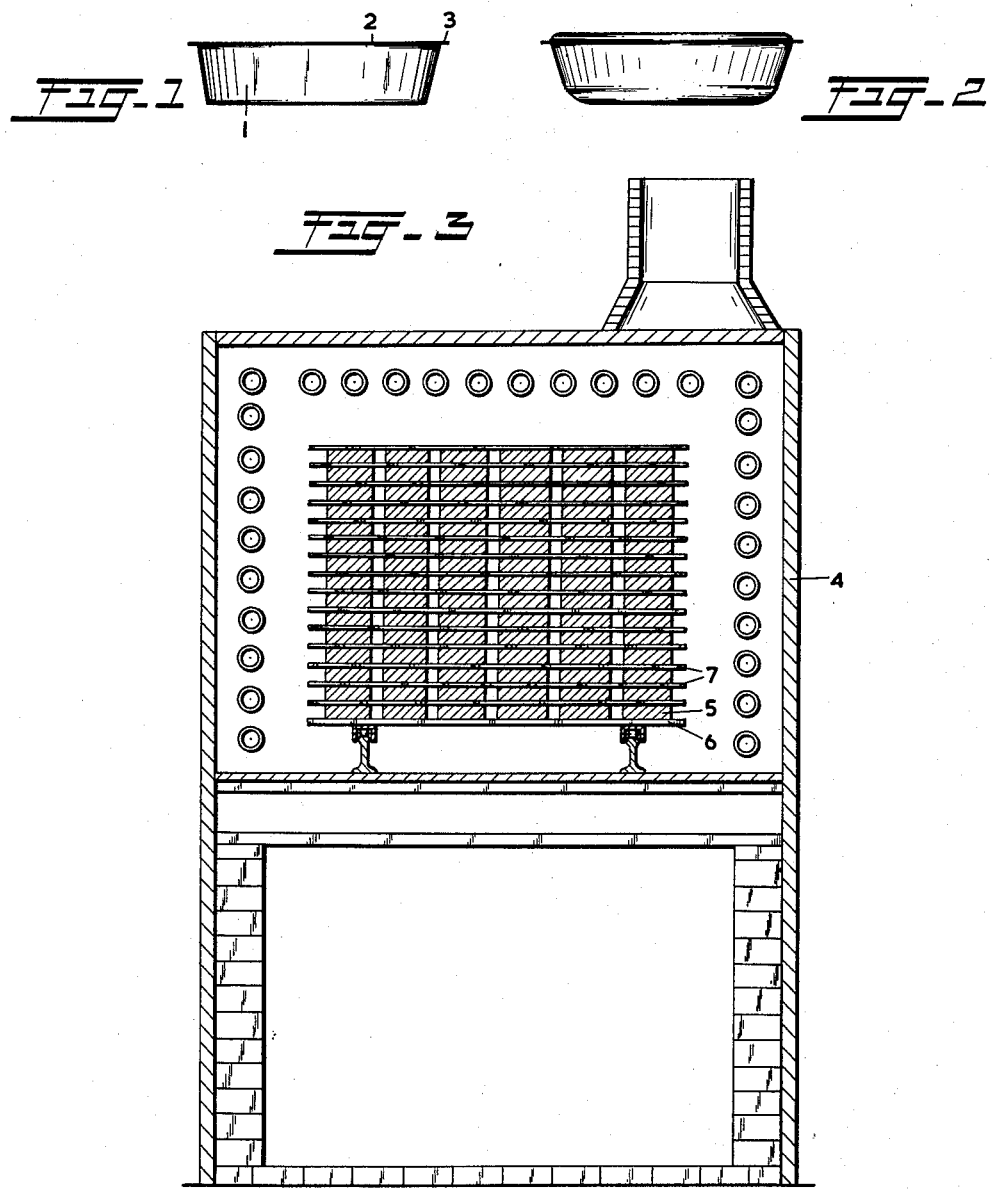

INVENTOR
KORNELIS VAN DE KERKE
BY Irwin S. Thompson
ATTORNEY

United States Patent Office 2,959,488
Patented Nov. 8, 1960

2,959,488

METHOD OF STERILIZING FOODSTUFF

Kornelis van de Kerke, 20 Zonnelaan, Hilversum, Netherlands

Filed June 27, 1957, Ser No. 668,381

Claims priority, application Netherlands July 14, 1956

5 Claims. (Class 99—211)

For the preservation of foodstuffs in glass or metal containers a variety of systems and apparatus is known. It is, however, a drawback that the price of these glass or metal containers is comparatively high. This drawback might be obviated to a considerable extent if it should be possible to preserve foodstuffs in containers made of plastics, e.g. polyvinyl chloride, but this involves the great problem that the plastic material from which such containers are to be made is not proof against and deformation-resistant at the temperatures usually required for preservation, since e.g. if containers of polyvinyl chloride are used, the latter become so soft already at a temperature of 60° C. that they are completely deformed. When it is desired to preserve foodstuffs in such containers, made of polyvinyl chloride, at the requisite temperatures of e.g. 100° C. or higher, the containers, which originally were, for example, cylindrical, are deformed to the most curious shapes, in consequence of which they are no longer salable in view of the unattractive appearance they have thus obtained, even apart from the risk of damage.

Now the invention has for its object to provide a method which makes it possible to preserve foodstuffs in a simple manner in containers entirely or partially consisting of plastics at temperatures which may amount to more than 100°, while the original shape of the containers is largely or completely preserved.

According to the invention this object is attained by the fact that at least a part of the plastic walls of the container is supported. Since the plastic material is ductile, this method of supporting a part of the plastic walls softening at the high preservation temperatures has the result that in these places the plastic walls, under the influence of the tension produced inside the container, come to rest against the supporting surfaces, and their shape and its preservation respectively are conditioned by the nature of the supporting surfaces. If only a part is supported, the remaining surfaces may be deformed, but certain container shapes can be imagined for which this is by no means a disadvantage, but on the contrary finally results in a container whose external shape has become very attractive owing to the partially controlled and partially free deformation.

Since with all containers it is the flat surfaces which are most liable to deformation, according to the invention it is desirable to support only the flat walls of such containers. If a comparatively flat container in the form of an inverted truncated cone is taken, when the flat upper and lower walls are supported it will be deformed in such a way that a dish model with curved sides but flat upper and lower walls is formed. If this container is made with an opaque, e.g. white, lower portion and a transparent upper surface, a closed dish is formed, the preserved contents of which are visible and can also be consumed therefrom after removal of the upper surface.

Naturally it is also possible according to the invention to support all the walls, which is of importance especially with larger containers, and e.g. with cubical containers and the like.

The method can be carried into effect by fixing the flat parts of the containers between plates. If, for example, hexagonal containers are taken, these can be stacked in the form of a honeycomb and fixed between vertical or horizontal plates, so that all the surfaces are supported, either by the plates or because the containers support each other.

It is, however, also possible to fix cylindrical or similar containers with flat upper and lower surfaces between plates, while these containers may, if desired, be stacked by placing on each layer of containers a plate, which then serves as a base for the next layer, and by loading or fixing the uppermost plate.

With relatively high containers, and in particular at temperatures above 100° C., it is advisable to support the walls which are not in contact with the plates by rings fitting round them.

According to the invention this results in an apparatus in which plates and rings have been combined to matrices.

According to the invention it is further possible to place each container to be preserved in a box or the like fitting round it, which can be closed. When the container is thus enclosed on all sides, its shape is fully preserved, and the box in which the container is present during the preservation constitutes an independent unit, which can repeatedly be used again. If necessary, a large number of such boxes can be introduced into an oven in any desired way, but in particular with such boxes a continuous preservation process is possible. It is even possible to employ an endless belt with pan-shaped depressions, which belt passes through a preserving oven, which comprises an endless belt serving as delimitation, which supports the containers placed in the depressions at their free upper surfaces.

If separate boxes are used, which may be placed on a belt, according to the invention they consist of a material of good heat-conductivity, and they have an easily unloaded shape and a lid that can be quickly closed, e.g. with a bayonet joint.

According to the invention it is further possible for one or more of the supporting surfaces to be provided with a profile. This may serve to indicate the contents or the brand, but also to produce an impression or rim which facilitates opening.

The invention is now to be elucidated more in detail with reference to the drawings.

Figure 1 shows a container of polyvinyl chloride before the preservation process.

Figure 2 shows the same container after the preservation by the method according to the invention.

Figure 3 is a cross-section of an oven in which a large number of containers are preserved by the method according to the invention.

Figure 4:
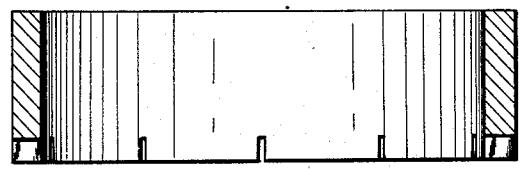
Figure 4 shows a cross-section of the ring for supporting the sides.

Figure 1 illustrates a container consisting of a receptacle 1 with a lid 2, which have been welded together by heating along the rim 3. This container contains some substance to be preserved.

Figure 2 illustrates the same container after the preservation process, with the upper and the lower surface fixed. As appears from the drawing, upper and lower surface have remained flat and only the sides have become slightly rounded, while the lid has also become slightly rounded at the rims, owing to which a shape resembling a plate or dish has been obtained, which is very attractive, in particular when the possibilities of construcing the container entirely or partially of coloured or transparent material are also considered.

Figure 3 illustrates an oven 4, in which a large number of containers are preserved simultaneously, said containers 5 having been placed in layers, first of all on a base plate 6 and next on plates 7 placed between the various layers, the load being caused by the weight of the containers and the plates as well as by the fixing of the uppermost plate.

Figure 4 illustrates a ring, provided with passage slots on the lower rim, for supporting the sides of containers which have comparatively high sides or in which the preservation takes place at temperatures of more than 100°. This ring may also consist of a thin strip of material of good heat conductivity, e.g. light metal.

The material preferably used for the containers is polyvinyl chloride, to which practically no plasticizers, if any, have been added, since plasticizers generally have a toxic action.

Figure 5:
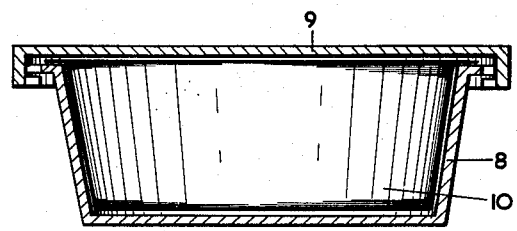
Figure 5 shows a cross-section of a box for preserving therein the foodstuffs in a plastic container.

Figure 5 illustrates a box 8 with a lid 9, which lid is kept in place by a bayonet joint. In the box the container 10 is present, the upper rim of which has been fixed between the lid and the upper rim of the box. Said boxes can be conveyed through an oven on a conveyor belt. They consist of material of very good heat-conductivity and can repeatedly be used. They can also be introduced into an oven in some other way, e.g. stacked.

Figure 6:
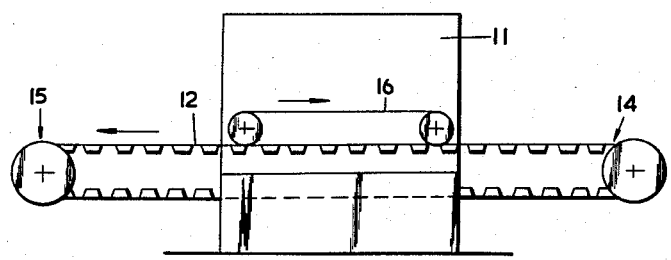
Figure 6 shows a diagram of an apparatus for continuously carrying out the preservation process.

Figure 6 shows a diagram of an apparatus for continuously carrying out the preservation process. This apparatus consists of the oven 11, through which passes the upper portion of a conveyor belt 12, which has been provided with basin-shaped depressions 13. At the feeding end 14 the containers with foodstuffs are placed in the depressions. At the discharge end 15 the unloading takes place automatically. In the oven an endless belt 16 is present, the lower portion of which is guided and is kept against the upper portion of the belt 12, by which means the upper surfaces of the containers present in the depressions are supported.

What I claim is:

1. A method of sterilizing foodstuff within a semi-rigid self-sustaining and shape-retaining dish-like container having a semi-rigid self-sustaining and shape-retaining lid sealed thereon, the container and lid being formed of a polyvinyl chloride thermoplastic resin heat-deformable at a sterilizing temperature, comprising heating at ambient pressure the sealed container to a sterilizing temperature while supported on a surface of a restraining support and while having a surface of a restraining member in contact with the upper surface of the lid to prevent deformation of the bottom of the container and of the lid.

2. A method of sterilizing foodstuff within a semi-rigid self-sustaining and shape-retaining dish-like container having a semi-rigid self-sustaining and shape-retaining lid sealed thereon, the container and lid being formed of a polyvinyl chloride thermoplastic resin heat-deformable at a sterilizing temperature, comprising heating at ambient pressure the sealed container to a sterilizing temperature while supported on a flat surface of a restraining support and while having a flat surface of a restraining member in contact with the upper surface of the lid to prevent deformation of the bottom of the container and of the lid.

3. A method according to claim 1, in which the portions of the container other than the bottom and lid are unsupported during heating.

4. A method according to claim, in which the portions of the container other than the bottom and lid are mechanically restrained from deformation during heating to a further temperature in excess of said sterilizing temperature.

5. A method according to claim 1, in which at least one of the restraining surfaces is contoured to impart a corresponding contour to the surface of the container restrained thereby.

References Cited in the file of this patent
UNITED STATES PATENTS

| | | |
|---|---|---|
| 2,047,957 | Flecher | July 21, 1936 |
| 2,102,208 | Kronquest | Dec. 14, 1937 |
| 2,111,395 | Hartwick | Mar. 15, 1938 |
| 2,122,537 | Pfeffer | July 5, 1938 |
| 2,150,058 | Fraizer | Mar. 7, 1939 |
| 2,156,987 | Hill | May 2, 1939 |
| 2,380,134 | Waters | July 10, 1945 |